(12) United States Patent
Zhang et al.

(10) Patent No.: US 11,124,089 B2
(45) Date of Patent: Sep. 21, 2021

(54) HUMAN BODY PRESSURE SWITCH, VEHICLE SEAT, VEHICLE AND METHOD FOR PROCESSING HUMAN BODY PRESSURE SWITCH

(71) Applicant: Langfang Golden Time Technology Development Co., Ltd., Hebei (CN)

(72) Inventors: Haitao Zhang, Hebei (CN); Xiqing Li, Hebei (CN)

(73) Assignee: LANGFANG GOLDEN TIME TECHNOLOGY DEVELOPMENT CO., LTD., Hebei (CN)

( * ) Notice: Subject to any disclaimer, the term of this patent is extended or adjusted under 35 U.S.C. 154(b) by 0 days.

(21) Appl. No.: 16/090,488

(22) PCT Filed: Feb. 13, 2018

(86) PCT No.: PCT/CN2018/076589
§ 371 (c)(1),
(2) Date: Oct. 1, 2018

(87) PCT Pub. No.: WO2018/210022
PCT Pub. Date: Nov. 22, 2018

(65) Prior Publication Data
US 2020/0376984 A1 Dec. 3, 2020

(30) Foreign Application Priority Data
May 18, 2017 (CN) .......................... 201710350778.9

(51) Int. Cl.
*H01H 13/16* (2006.01)
*B60N 2/00* (2006.01)
(Continued)

(52) U.S. Cl.
CPC .............. *B60N 2/002* (2013.01); *B60R 22/48* (2013.01); *H01H 3/141* (2013.01); *H01H 13/16* (2013.01);
(Continued)

(58) Field of Classification Search
CPC ........ H01H 35/003; H01H 3/14; H01H 13/16; H01H 2231/026; H01H 35/00;
(Continued)

(56) References Cited

U.S. PATENT DOCUMENTS

| 6,591,685 B2 | 7/2003 | Kraetzl et al. |
| 6,940,030 B2 * | 9/2005 | Takeda ................. H01H 13/705 200/343 |

(Continued)

FOREIGN PATENT DOCUMENTS

| CN | 102910133 A | 2/2013 |
| CN | 203093974 U | 7/2013 |

(Continued)

*Primary Examiner* — Ahmed M Saeed
(74) *Attorney, Agent, or Firm* — Dinsmore & Shohl LLP (57) ABSTRACT

Provided is a human body pressure switch, a vehicle seat, a vehicle, and a method for processing a human body pressure switch. The human body pressure switch includes: a pressure switch element, an elastic pressure-contact body provided at the upper side or the lower side of the pressure switch element, in which the elastic pressure-contact body includes a spacing support structure and a force support protrusion, the force support protrusion corresponds to a sensing contact of the pressure switch element, in a state with pressure from an external force, amount of deformation of the spacing support structure is greater than amount of deformation of the force support protrusion, and in a state without pressure from the external force, the spacing support structure plays a supporting role.

17 Claims, 6 Drawing Sheets

(51) Int. Cl.
  *B60R 22/48* (2006.01)
  *H01H 3/14* (2006.01)
  *H01H 35/00* (2006.01)

(52) U.S. Cl.
  CPC ... *H01H 35/003* (2013.01); *B60R 2022/4858* (2013.01)

(58) Field of Classification Search
  CPC ...... H01H 3/141; H01H 13/14; H01H 13/705; H01H 13/20; H01H 13/52; H01H 13/7065; H01H 13/7057; H01H 13/704; H01H 13/785; H01H 13/48; H01H 13/12; H01H 13/702; H01H 13/28; H01H 13/30; H01H 13/36; H01H 1/24; B60R 2022/4858; B60N 2/002; B60N 2/0228; B60N 2/02; B60N 2/242; B60N 2/64; B60N 2/54
  See application file for complete search history.

(56) References Cited

U.S. PATENT DOCUMENTS

| | | | |
|---|---|---|---|
| 2010/0192698 A1* | 8/2010 | Hansen | B60N 2/002 |
| 2016/0093454 A1* | 3/2016 | Sauer | G06F 3/0338 |
| | | | 200/521 |

FOREIGN PATENT DOCUMENTS

| | | |
|---|---|---|
| CN | 203331880 U | 12/2013 |
| CN | 204142399 U | 2/2015 |
| CN | 107097690 A | 8/2017 |
| CN | 206826437 U | 1/2018 |
| DE | 112013002709 T5 | 2/2015 |
| JP | 2016088471 A | 5/2016 |
| JP | 2016144983 A | 8/2016 |
| JP | 2016144984 A | 8/2016 |

* cited by examiner

HUMAN BODY PRESSURE SWITCH, VEHICLE SEAT, VEHICLE AND METHOD FOR PROCESSING HUMAN BODY PRESSURE SWITCH

CROSS-REFERENCE TO RELATED APPLICATION

The present application is a 371 U.S. National Phase of International application No. PCT/CN2018/076589, filed Feb. 13, 2018, which claims priority to Chinese patent application No. 201710350778.9, filed with the State Intellectual Property Office on May 18, 2017 and entitled "Human Body Pressure Switch and Vehicle Seat", the contents of which are incorporated herein by reference in entirety.

TECHNICAL FIELD

The present disclosure relates to the technical field of vehicle seats, and particularly to a human body pressure switch, a vehicle seat, a vehicle and a method for processing a human body pressure switch.

BACKGROUND ART

With the development of science and technology in the field of vehicle transportation, increasing importance has been attached, by the market, to the application requirement of seat-user monitoring in the field of occupant seat-belt alert. The presence of a seat user can be sensed effectively by a pressure switch element detecting, through seat, the presence of the human body pressure from a surface of the seat, implementing a function of exploring the user presence.

A simple application of such type of human body pressure switch for a seat is to arrange a foil switch element and a mating structure between a bearing framework and a cushion foamed pad inside a vehicle seat. When the pressure from a human buttock acts on the seat surface of the sponge bearing pad of the seat, the weight of the human body press the human body pressure switch, thereby triggering a sensing contact of a corresponding pressure switch element, achieving its circuit output characteristic with an on-off feature.

In such an application, an elastic foamed sponge material is typically used as the activation triggering material for the foil switch element. That is, by deforming the elastic foamed sponge material via an applied pressure, the sensing contact of the pressure switch element dents, which makes the contact conducted. In the case where the human body leaves the seat, the elastic foamed sponge material and the sensing contact of the pressure switch element regains their shapes, which makes the contact disconnected.

However, since the elastic foamed sponge material may have features of poor material quality, such as unstable elasticity and density features and excessively large local hardness deviations for different batches of raw materials, the usage sensitivity of such type of human body pressure switch product for a seat is affected. Moreover, since the elastic foamed sponge material also often undergoes the irreversible shape deformations and elastic modulus changes after being used under a long-term pressure in the vehicle, the normal pressure activating state of the sensing contact of the pressure switch element may also be affected, and the application function failure of the product may even be caused.

Therefore, it is urgent for those skilled in the art to solve the technical problem of how to reduce the possibility of falsely triggering the human body pressure switch.

SUMMARY OF THE DISCLOSURE

One of the objects of the present disclosure is to provide a human body pressure switch to reduce the possibility of falsely triggering the human body pressure switch.

Another object of the present disclosure is to provide a vehicle seat to reduce the possibility of falsely triggering the human body pressure switch.

Still another object of the present disclosure is to provide a vehicle to reduce the possibility of falsely triggering the human body pressure switch.

Still another object of the present disclosure is to provide a method for processing a human body pressure switch to reduce the possibility of falsely triggering the human body pressure switch.

In order to achieve at least one of the above objects, the present disclosure provides the technical solutions as follows.

A human body pressure switch includes:

a pressure switch element; and an elastic pressure-contact body provided on an upper side or a lower side of the pressure switch element, where the elastic pressure-contact body includes a spacing support structure and a force support protrusion, the force support protrusion corresponds to a sensing contact of the pressure switch element. The spacing support structure, in a state of an external force applied, is deformed by amount greater than the amount of deformation of the force support protrusion. The spacing support structure, in a state of no external force applied, plays a supporting role.

Further, in the above human body pressure switch, the force support protrusion is of a solid structure, and has a wall thickness greater than the wall thickness of the spacing support structure.

Further, in the above human body pressure switch, the elastic pressure-contact body is located between the pressure switch element and a sponge cushion of a vehicle seat.

Further, in the above human body pressure switch, the material of the elastic pressure-contact body is an elastic rubber-plastic material.

Further, in the above human body pressure switch, the material of the elastic pressure-contact body is selected from the group consisting of natural rubber, elastic silicone rubber, ethylene propylene diene monomer rubber, styrene-butadiene rubber, flexible polyurethane elastomer plastic and polyolefin thermoplastic elastomer plastic.

Further, in the above human body pressure switch, the elastic pressure-contact body includes a plurality of the spacing support structures, and the plurality of the spacing support structures are provided to be spaced apart from each other. And one force support protrusion is provided between every two adjacent spacing support structures.

Further, in the above human body pressure switch, one side of the elastic pressure-contact body facing away from the force support protrusion is a force-supporting surface. The force-supporting surface is configured to provide a force for pressing down a top of the sensing contact of the pressure switch element, for being depressed.

Further, in the above human body pressure switch, the spacing support structure is of a bending structure, a hollow structure or a spaced hollow structure.

Further, in the above human body pressure switch, the spacing support structure protrudes outward from one side of the elastic pressure-contact body, and is provided with an inwardly recessed groove at the other side of the elastic pressure-contact body, with the spacing support structure being arch-shaped.

Further, in the above human body pressure switch, the elastic pressure-contact body includes a receiving slot, the force support protrusion is provided at a bottom of the receiving slot and the force support protrusion extends towards a slot opening of the receiving slot and protrudes beyond the slot opening of the receiving slot. Two spacing support structures, located at a same side of the force support protrusion and adjacent to the force support protrusion, form one spacing support structure group. The two spacing support structures in the spacing support structure group protrude outward from opposite sides of the elastic pressure-contact body, respectively. One spacing support structure of the two spacing support structures in the spacing support structure group, which is closer to the force support protrusion protrudes from the elastic pressure-contact body in a same direction as a direction in which the force support protrusion protrudes. A direction in which the other spacing support structure in the spacing support structure group protrudes from the elastic pressure-contact body in a direction opposite to the direction in which the force support protrusion protrudes.

Further, in the above human body pressure switch, each of the two spacing support structures in the spacing support structure group is U-shaped or V-shaped, and is provided with an inwardly recessed groove at a side away from the spacing support structures. The groove is a U-shaped groove or a V-shaped groove.

Further, in the above human body pressure switch, the spacing support structure as a whole is of a hollow structure, both ends of the spacing support structure protrude outward from opposite sides of the elastic pressure-contact body, respectively. The force support protrusion protrudes outward from one side of the elastic pressure-contact body, a protrusion is provided at the other side of the elastic pressure-contact body facing away from the force support protrusion. One side surface of the protrusion away from the force support protrusion is a force-supporting surface.

Further, in the above human body pressure switch, the pressure switch element is arc-shaped, with the highest point of the pressure switch element corresponding to the protrusion on the elastic pressure-contact body in position.

Further, in the above human body pressure switch, the force support protrusion is of a cylindrical shape, a mushroom shape or a wall shape.

Further, in the above human body pressure switch, the following are further included:

a first pressure bearing plate provided at one side of the pressure switch element away from the elastic pressure-contact body; and a second pressure bearing plate provided at one side of the elastic pressure-contact body away from the pressure switch element.

Further, in the above human body pressure switch, the elastic pressure-contact body is located between the pressure switch element and the second pressure bearing plate. The force support protrusion protrudes outward from one side of the elastic pressure-contact body away from the pressure switch element, an opening is provided at one side of the force support protrusion away from the pressure switch element, and the spacing support structure protrudes from the elastic pressure-contact body in a same direction as a direction in which the force support protrusion protrudes from the elastic pressure-contact body.

Further, in the above human body pressure switch, the pressure switch element and the elastic pressure-contact body each are provided therein with a fixing hole through which an attachment pin and/or a guide post can pass, and the pressure switch element and the elastic pressure-contact body are fixed by making the attachment pin and/or the guide post pass through the first pressure bearing plate and the second pressure bearing plate.

Further, in the above human body pressure switch, the pressure switch element is a foil switch element or a microswitch, with the microswitch consisting of a metal dome and a Printed Circuit Board (PCB).

According to another aspect of the present disclosure, provided is a vehicle seat including a human body pressure switch, the human body pressure switch being any of the above human body pressure switches.

According to still another aspect of the present disclosure, provided is a vehicle including the above vehicle seat.

According to still another aspect of the present disclosure, provided is a method for processing a human body pressure switch, the method for processing a human body pressure switch including:

providing an elastic pressure-contact body on an upper side or a lower side of a pressure switch element, where the elastic pressure-contact body includes a spacing support structure and a force support protrusion; and making the force support protrusion correspond to a sensing contact of the pressure switch element;

where, the spacing support structure, in a state of an external force applied, is deformed by amount greater than the amount of deformation of the force support protrusion, and the spacing support structure, in a state of no external force applied, plays a supporting role.

As can be seen from the above technical solutions, in the human body pressure switch provided by embodiments of the present disclosure, an elastic pressure-contact body is provided at an upper side or a lower side of the pressure switch element, and provides a spacing effect in a pre-pressure-bearing state; during a course where the human body pressure switch is triggered by an external pressure, the spacing support structure is compressed; however, since the amount of compression of the force support protrusion is less than that of the spacing support structure, the force support protrusion can provide a force for pressing down a top of a sensing contact of the pressure switch element, for being depressed. Different from the averaged pressure exerting and force bearing manner of the conventional sponge seat cushion, the force for pressing down a top enables a pressure trigger manner making the protrusion structure act as a concentrated force bearing point of the force exerting center, and thus, the conducting of the sensing contact of the pressure switch element can be implemented directly and stably. In the present disclosure, in a state where no person is seated on the seat, due to the supporting role of the spacing support structure, the sensing contact of the pressure switch element is prevented from being affected by a pre-pressing force, such as the internal stress of the sponge structure of the seat and the weight of the sponge cushion.

where 100 represents a second pressure bearing plate, 200 an elastic pressure-contact body, 201 a force support protrusion, 202 a spacing support structure, 203 a force-supporting surface, 300 a pressure switch element, 301 a first switch substrate, 302 a first conductive switching layer, 303 a switch off-contact layer, 304 a second conductive switching layer, 305 a second switch substrate, 306 a switch hollow hole, 307 a sensing contact, 400 a first pressure bearing plate, 500 a seat cushion, 600 a cushion frame, 700 an attachment pin, 800 a wire joint, 900 a connector, and 1000 a guide post.

DETAILED DESCRIPTION OF EMBODIMENTS

A main point of the present disclosure is to provide a human body pressure switch and a vehicle seat to reduce the possibility of falsely triggering the human body pressure switch.

The technical solutions in the embodiments of the present disclosure will be described clearly and completely in conjunction with the drawings in the embodiments of the present disclosure. It is apparent that the embodiments described are some, but not all of the embodiments of the present disclosure. All the other embodiments, obtained by those skilled in the art based on the embodiments of the present disclosure, will fall within the claimed scope of the present disclosure.

Figure 1:
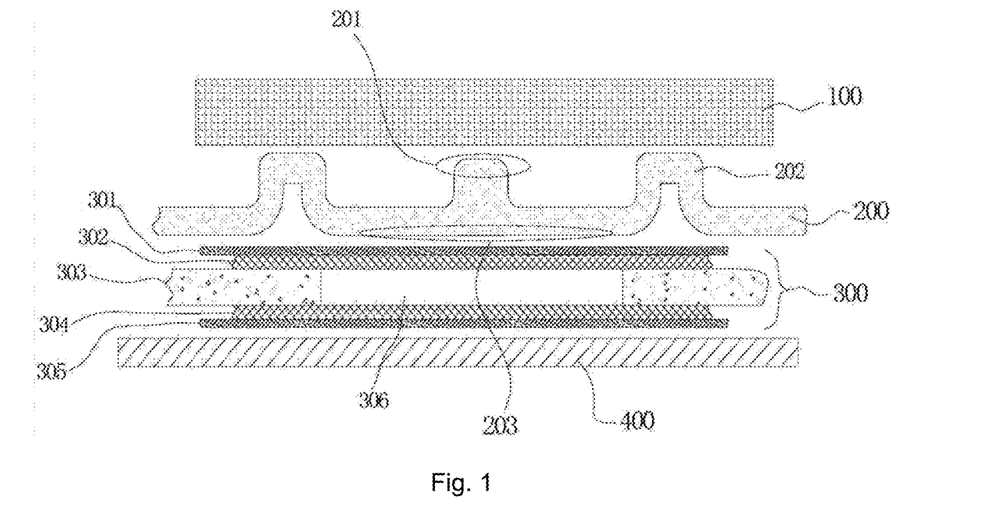
FIG. 1 is a schematic structural diagram of a human body pressure switch provided by an embodiment of the present disclosure in an unstressed state.
Figure 2:
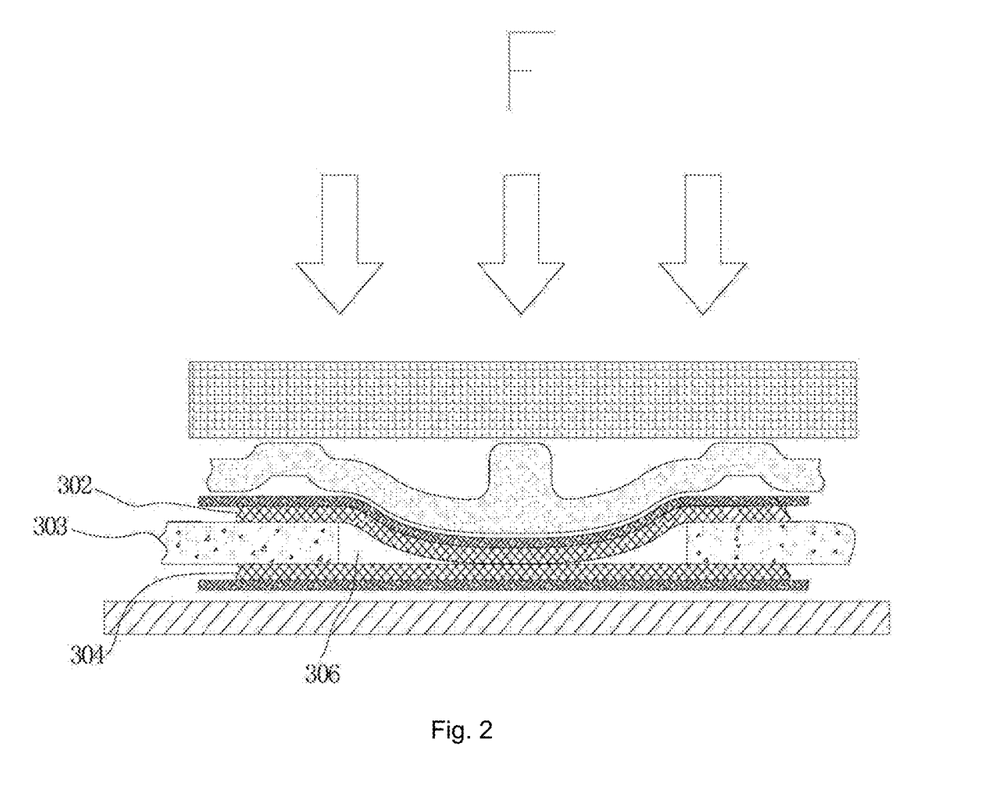
FIG. 2 is a schematic structural diagram of a human body pressure switch provided by an embodiment of the present disclosure in a stressed state.

Referring to FIGS. 1 and 2, FIG. 1 is a schematic structural diagram of a human body pressure switch provided by an embodiment of the present disclosure in an unstressed state; and FIG. 2 is a schematic structural diagram of a human body pressure switch provided by an embodiment of the present disclosure in a stressed state.

The human body pressure switch provided by an embodiment of the present disclosure includes a pressure switch element 300 and an elastic pressure-contact body 200. The elastic pressure-contact body 200 is provided at the upper side or the lower side of the pressure switch element 300; and optionally, the elastic pressure-contact body 200 is located between the pressure switch element 300 and a sponge seat cushion of a vehicle seat.

The elastic pressure-contact body 200 includes a spacing support structure 202 and a force support protrusion 201; the force support protrusion 201 corresponds to a sensing contact 307 of the pressure switch element 300 (see FIG. 4); the spacing support structure 202, in a state of an external force applied, is deformed by amount greater than the amount of deformation of the force support protrusion 201; the spacing support structure 202, in a state of no external force applied, plays a supporting role.

In an embodiment of the present disclosure, the elastic pressure-contact body includes a plurality of spacing support structures 202, the plurality of spacing support structures 202 are provided to be spaced apart from each other, and one force support protrusion 201 is provided between every two adjacent spacing support structures 202. The spacing support structure 202 and the force support protrusion 201 both protrude towards one side of the elastic pressure-contact body; one side of pressure-contact body facing away from the force support protrusion 201 is a force-supporting surface 203; a groove, which is recessed inwardly, is provided at one side of the elastic pressure-contact body facing away from the spacing support structure 202. The groove is optionally Y-shaped, that is, the groove has a notch with a wider width, and the width of the groove gradually decreases from the notch thereof to the bottom thereof.

In the human body pressure switch provided by the present disclosure, an elastic pressure-contact body 200 is provided on the upper side or the lower side of the pressure switch element 300, providing a spacing effect in a pre-pressure-bearing state; during a course where the human body pressure switch is triggered by an external pressure, the spacing support structure 202 is compressed and the amount of compression of the force support protrusion 201 is less than the spacing support structure 202, so the force support protrusion 201 can provide a force for pressing down a top for depressing a sensing contact 307 of the pressure switch element 300; and different from the averaged pressure exerting and force bearing manner of the conventional sponge seat cushion, the force for pressing down a top enables a pressure trigger manner making the protrusion structure act as a concentrated force bearing point of the force exerting center, and the conducting of the sensing contact 307 of the pressure switch element 300 can be implemented directly and stably. In the present disclosure, in a state where no person is seated on the seat, due to the supporting role of the spacing support structure, the sensing contact 307 of the pressure switch element 300 is prevented from being affected by a pre-pressing force such as the internal stress of the sponge structure of the seat and the weight of the sponge cushion.

Figure 4:
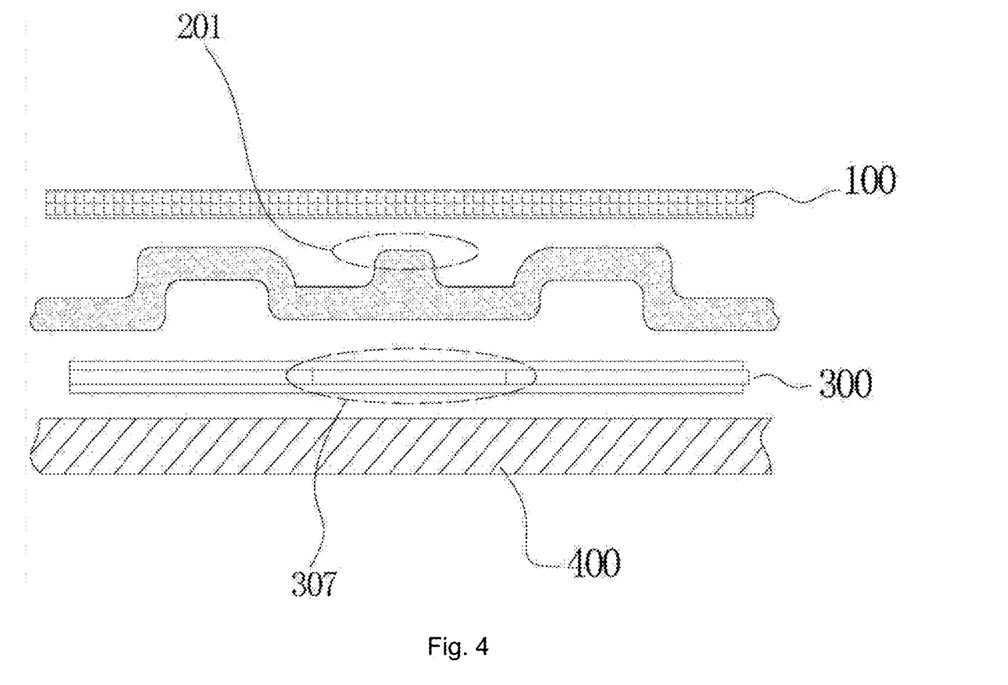
FIG. 4 is a schematic structural diagram of a human body pressure switch provided by a first embodiment of the present disclosure.

The pressure switch element 300 may further include a switch off-contact layer 303; a first conductive switching layer 302 is provided at the upper side of the switch off-contact layer 303; a second conductive switching layer 304 is provided at the lower side of the switch off-contact layer; and a first switch substrate 301 is provided at the side of the first conductive switching layer 302 away from the switch off-contact layer 303 and a second switch substrate 305 is provided at the side of the second conductive switching layer 304 away from the switch off-contact layer 303. The switch off-contact layer 303 has a switch hollow hole 306; and when the pressure switch element 300 is subjected to a pressure, the first conductive switching layer 302 and the second conductive switching layer 304 are in contact at the switch hollow hole 306, enabling the conducting of the circuit. A position where the switch hollow hole 306 locates is the position of the sensing contact 307.

In a specific embodiment of the present disclosure, the force support protrusion 201 is of a solid structure, and has a wall thickness greater than the wall thickness of the spacing support structure 202. Since the force support protrusion 201 is of a solid structure and has a wall thickness greater than the wall thickness of the spacing support structure 202, the amount of compression thereof is relatively small, and in a state of being pressed by an external force, the force support protrusion 201 has a larger displacement, and the spacing support structure 202 has a smaller displacement due to its own deformation.

In a specific embodiment of the present disclosure, the material of the elastic pressure-contact body 200 is elastic rubber-plastic material. For example, the material of the elastic pressure-contact body 200 is selected from the group consisting of natural rubber, elastic silicone rubber, ethylene propylene diene monomer rubber, styrene-butadiene rubber, flexible polyurethane elastomer plastic and polyolefin thermoplastic elastomer plastic. Making use of the advantages that the elastic rubber-plastic material can be structurally molded and modeled and produced in a large-scale conveniently, the elastic pressure-contact body 200 successfully avoids various drawbacks of the traditional elastic foamed sponge material. Since the elastic pressure-contact body 200 is made of a flexible elastic material, by means of the flexible deformation of the flexible elastic material, when an external force acts on the pressure switch element 300 and its sensing contact 307, such a thin-film electronic switch may be prevented from mechanical damages caused by long-term external force impacts.

Figure 5:
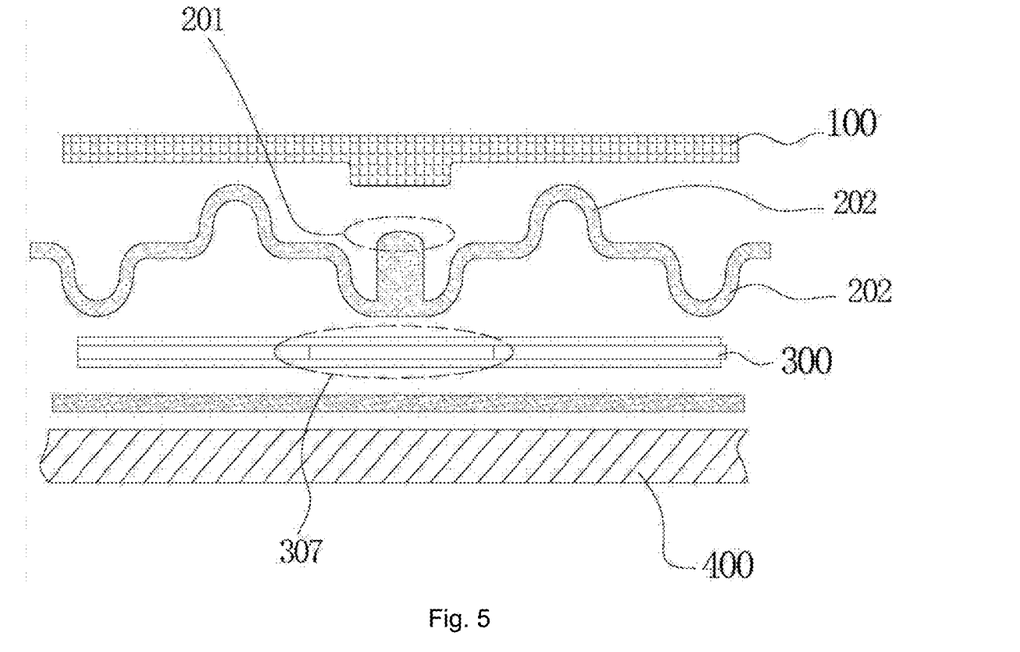
FIG. 5 is a schematic structural diagram of a human body pressure switch provided by a second embodiment of the present disclosure.
Figure 6:
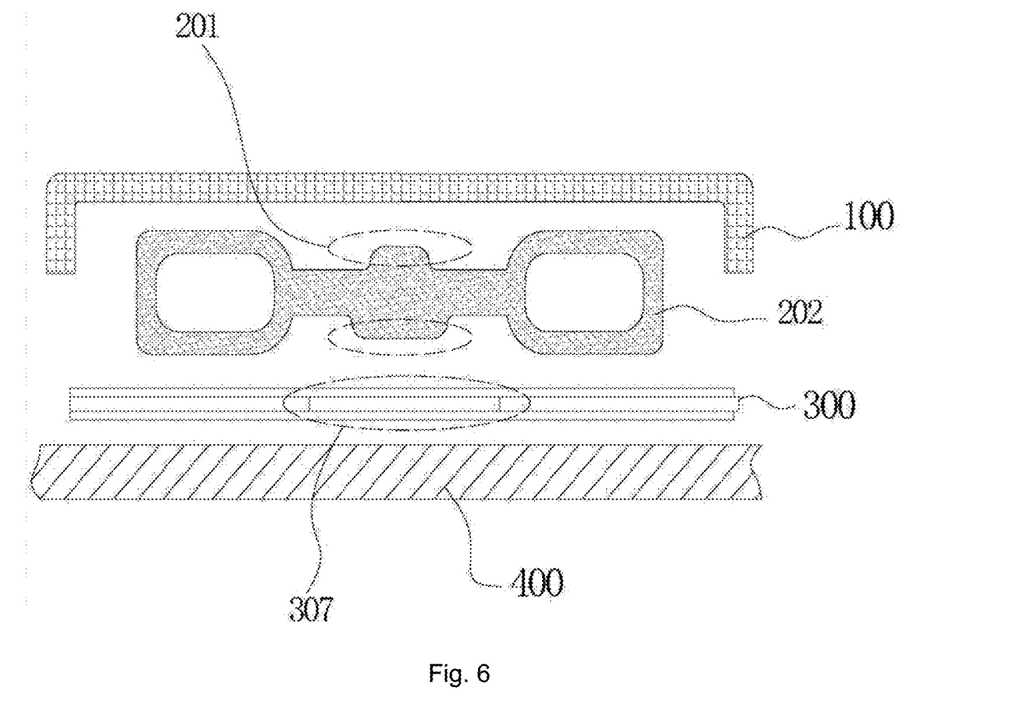
FIG. 6 is a schematic structural diagram of a human body pressure switch provided by a third embodiment of the present disclosure.

Referring to FIGS. 4-8, the spacing support structure 202 may be of a bending structure shown in FIGS. 4, 5, 7, and 8, and a hollow structure or a spaced hollow structure shown in FIG. 6. The sensing contact 307 of the pressure switch element 300 is supported in a state free from being directly pressed by the bottom surface of the seat cushion in a case where no person is seated on the seat. By doing so, in the case where no person is seated on the vehicle seat, it is possible to avoid the situation of falsely triggering the sensing contact 307 caused by a pre-pressing force such as the internal stress of the sofa structure of the seat and the weight of the seat cushion sponge.

In a specific embodiment of the present disclosure, referring to FIG. 4, the spacing support structure 202 protrudes outward from one side of the elastic pressure-contact body 200, and is provided with an inwardly recessed groove at the other side of the elastic pressure-contact body. The spacing support structure 202 is substantially arch-shaped, and the above groove is substantially a slot having a rectangular cross section.

In a specific embodiment of the present disclosure, referring to FIG. 5, the elastic pressure-contact body 200 has a receiving slot, and the force support protrusion 201 is provided at the bottom of the receiving slot and the force support protrusion extends towards the slot opening of the receiving slot and protrudes beyond the slot opening. Two spacing support structures 202, located at a same side of the force support protrusion 201 and adjacent to the force support protrusion 201 form one spacing support structure group, and the two spacing support structures 202 in the spacing support structure group protrude outward from opposite sides of the elastic pressure-contact body 200, respectively, and optionally, one spacing support structure 202 of the two spacing support structures 202 in the spacing support structure group, which is closer to the force support protrusion 201, protrudes from the elastic pressure-contact body 200 in a same direction as a direction in which the force support protrusion 201 protrudes, and then the other one of the two spacing support structures 202 in the spacing support structure group protrudes from the elastic pressure-contact body 200 in a direction opposite to the direction in which the force support protrusion 201 protrudes. Each of the two spacing support structures 202 in the spacing support structure group is substantially U-shaped, and is provided with an inwardly recessed groove at a side away from the spacing support structures; and optionally, the groove is substantially a U-shaped groove. It should be understood that both sides of the force support protrusion 201 may be provided with the above set of spacing support structures. In addition, referring to FIG. 8, optionally, based on the above structure, the two spacing support structures 202 may be substantially V-shaped, and the groove may be substantially V-shaped.

In a specific embodiment of the present disclosure, referring to FIG. 6, the spacing support structure 202 as a whole is of a hollow structure, and both ends of the spacing support structure protrude outward from the opposite sides of the elastic pressure-contact body 200, respectively; and optionally, the spacing support structure 202 as a whole is generally a rectangular body having a cavity inside. In addition, the force support protrusion 201 protrudes outward from one side of the elastic pressure-contact body 200, and a protrusion is provided at the other side of the elastic pressure-contact body 200 facing away from the force support protrusion 201, and tone side surface of the protrusion away from the force support protrusion 201 is a force-supporting surface 203.

Figure 7:
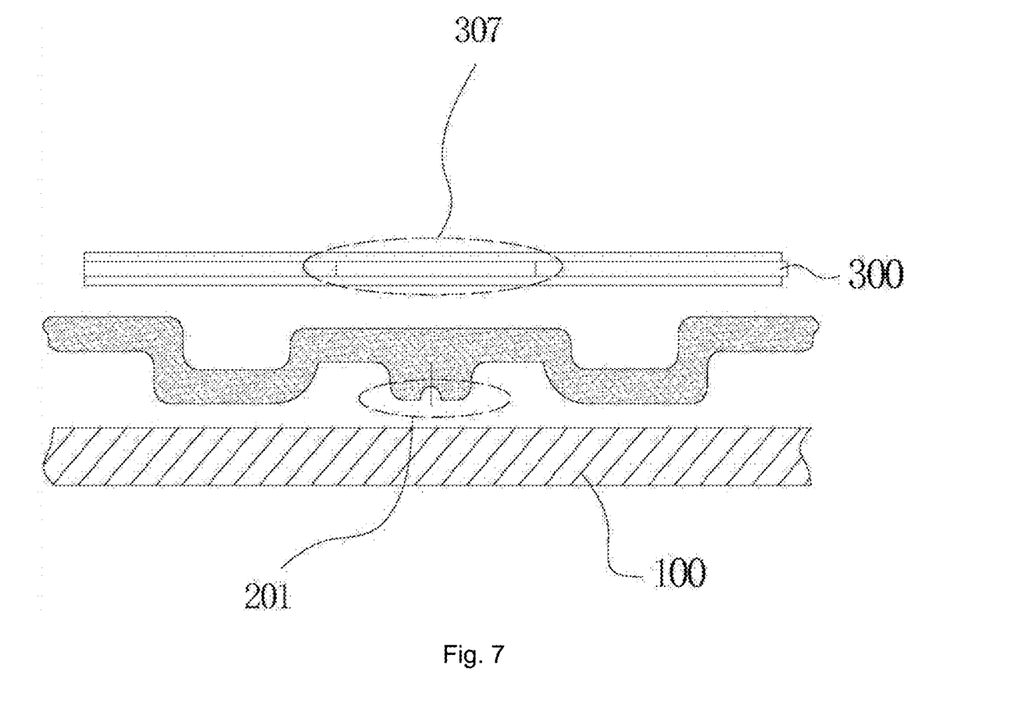
FIG. 7 is a schematic structural diagram of a human body pressure switch provided by a fourth embodiment of the present disclosure.
Figure 8:
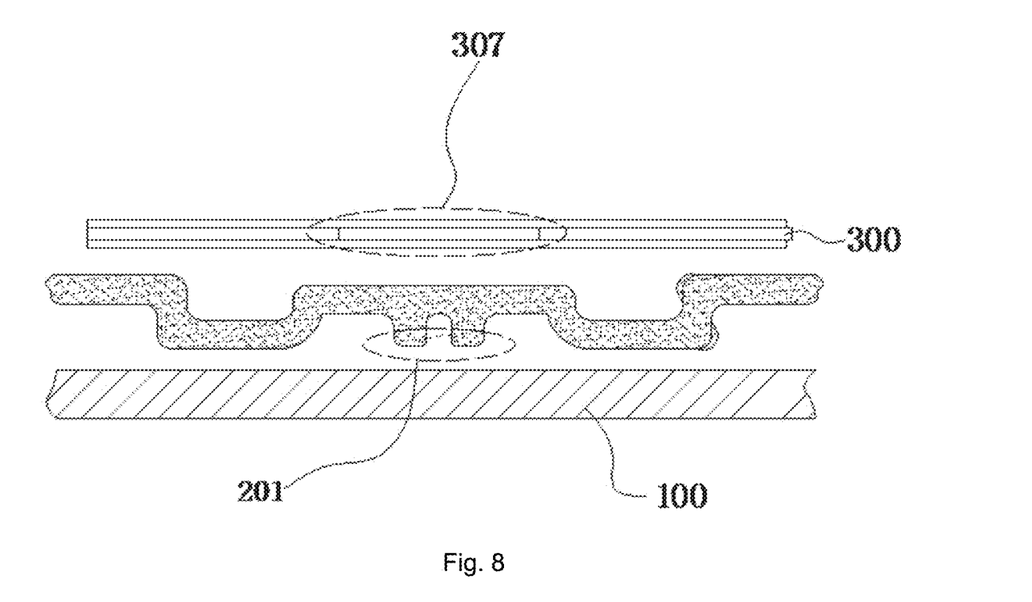
FIG. 8 is another schematic structural diagram of a human body pressure switch provided by a fourth embodiment of the present disclosure.
Figure 9:
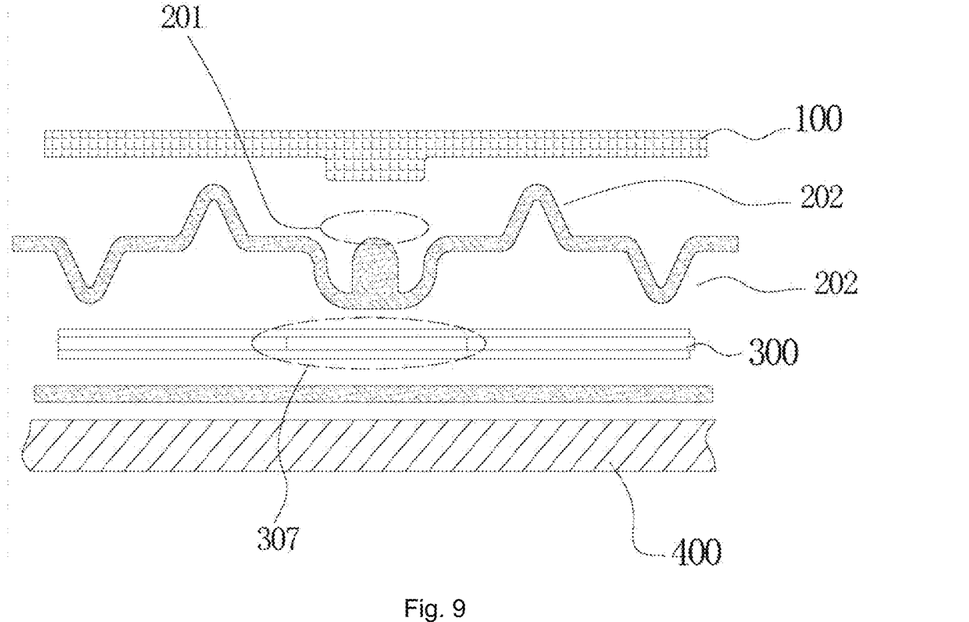
FIG. 9 is a schematic structural diagram of a human body pressure switch provided by a fifth embodiment of the present disclosure.

In a specific embodiment of the present disclosure, referring to FIGS. 7 and 8, the elastic pressure-contact body 200 is located between the pressure switch element 300 and a second pressure bearing plate 100, and the force support protrusion 201 protrudes outward from the side of the elastic pressure-contact body 200 away from the pressure switch element 300, that is, the force support protrusion 201 protrudes towards the first pressure bearing plate 400. An opening is provided at the side of the force support protrusion 201 away from the pressure switch element 300. The opening may be substantially semi-circular (as in FIG. 7) or substantially inverted U-shaped (as in FIG. 8). Moreover, a bottom wall of the opening may be substantially flush with a side surface the elastic pressure-contact body 200 away from the pressure switch element 300 (as in FIG. 8). The spacing support structure 202 protrudes from the elastic pressure-contact body 200 in a same direction as the direction in which the force support protrusion 201 protrudes from the elastic pressure-contact body 200. The spacing support structure 202 is generally rectangular. A groove is provided at a side facing away from the spacing support structure 202, and the groove may be a rectangular slot.

In a specific embodiment of the present disclosure, the force support protrusion 201 may be of a cylindrical shape, a mushroom shape or a wall shape. A side facing away from the force support protrusion 201 is a force-supporting surface 203 (see FIG. 10). During a course where the human body sensing switch is triggered by an external pressure, the force-supporting surface 203 may provide a force for pressing down a top for depressing a sensing contact 307 of the pressure switch element 300 under an effect for pressing down a top from the sponge cushion; and different from the averaged pressure exerting and force bearing manner of the conventional elastic foamed sponge material, the force for pressing down a top enables a pressure trigger manner making the force support protrusion 201 of the force-supporting surface 203 act as a concentrated force bearing point of the force exerting center, and the conducting of the sensing contact 307 of the pressure switch element 300 can be implemented directly and stably.

In a case where a person is seated on the vehicle seat, the elastic pressure-contact body 200 adopts a configuration that is distributed or surrounded a spaced support space at the circumference of the sensing contact 307 of the pressure switch element 300 and is deformed to be flatted under an action of an external force; the elastic pressure-contact body 200 corresponds to a pressure contact surface at the sensing contact 307 of the pressure switch element 300, and contacts the sensing contact 307 due to its bending caused by pressure. In this case, the pressure contact surface provides a force for pressing down a top for depressing the sensing contact 307 of the pressure switch element 300 under the effect for pressing down a top of the force-supporting surface 203 of the protrusion structure. The concentrated force bearing point, with the protrusion structure of the force-supporting surface 203 as the force exerting center, is applied to the sensing contact of the pressure switch element to implement the conducting of the sensing contact of the pressure switch element.

In a specific embodiment of the present disclosure, the human body pressure switch further includes a first pressure bearing plate 400 and a second pressure bearing plate 100. Specifically, the first pressure bearing plate 400 is provided at the side of the pressure switch element 300 away from the elastic pressure-contact body 200, and the second pressure bearing plate 100 is provided at the side of the elastic pressure-contact body 200 away from the pressure switch element 300.

Figure 10:
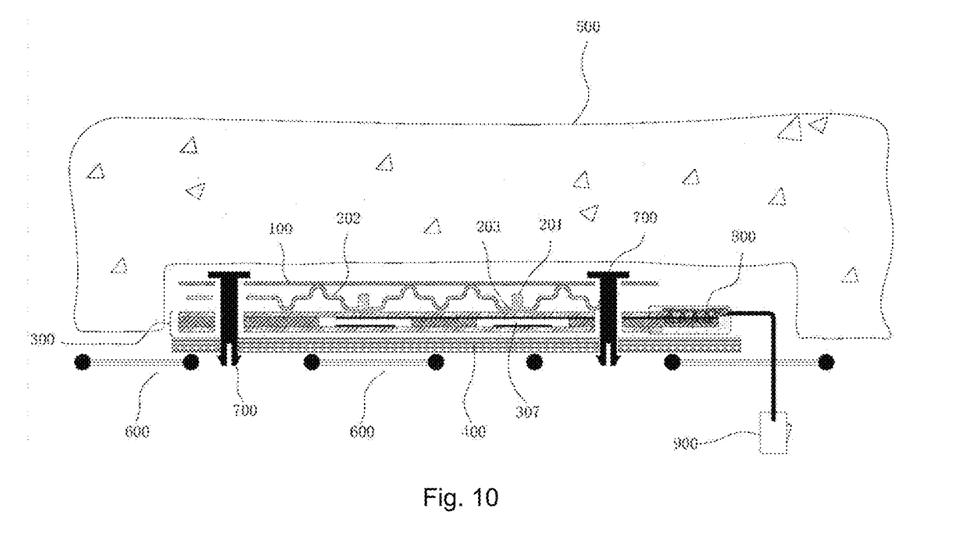
FIG. 10 is a cross-sectional view of a vehicle seat provided by an embodiment of the present disclosure.
Figure 11:
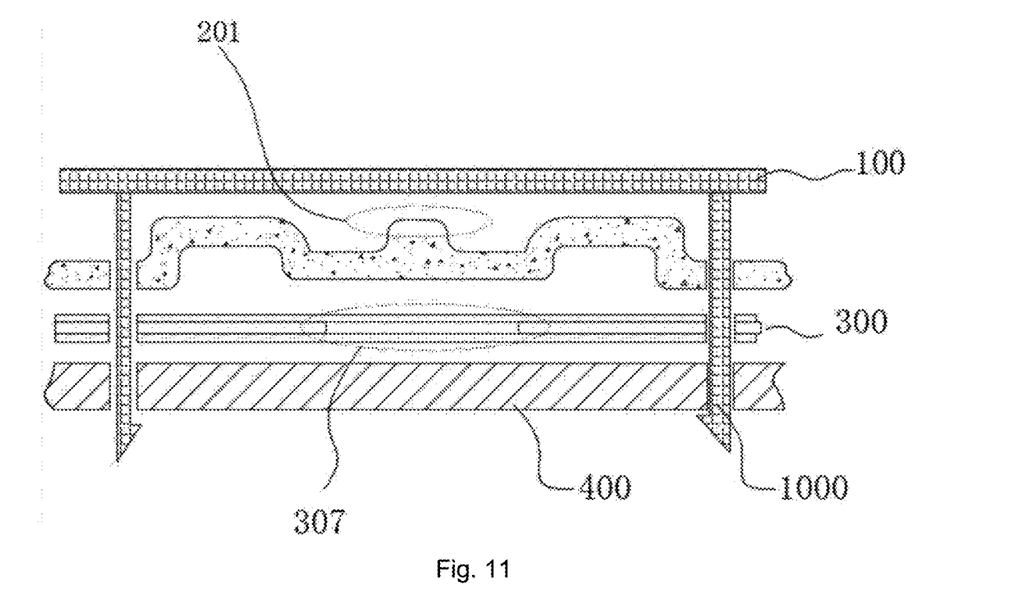
FIG. 11 is a schematic structural diagram of a human body pressure switch provided by a sixth embodiment of the present disclosure.

Referring to FIGS. 10 and 11, FIG. 10 is a cross-sectional view of a vehicle seat provided by an embodiment of the present disclosure; and FIG. 11 is a schematic structural diagram of a human body pressure switch provided by a sixth embodiment of the present disclosure.

The pressure switch element 300 and the elastic pressure-contact body 200 each are provided therein with a fixing hole through which an attachment pin 700 and/or a guide post 1000 can pass, and the pressure switch element 300 and the elastic pressure-contact body 200 are fixed by making the attachment pin 700 and/or the guide post 1000 passing through the first pressure bearing plate 400 and the second pressure bearing plate 100.

The pressure switch element 300 is a foil switch element or a microswitch, with the microswitch consisting of a metal dome and a PCB (as shown in FIG. 10).

Figure 12:
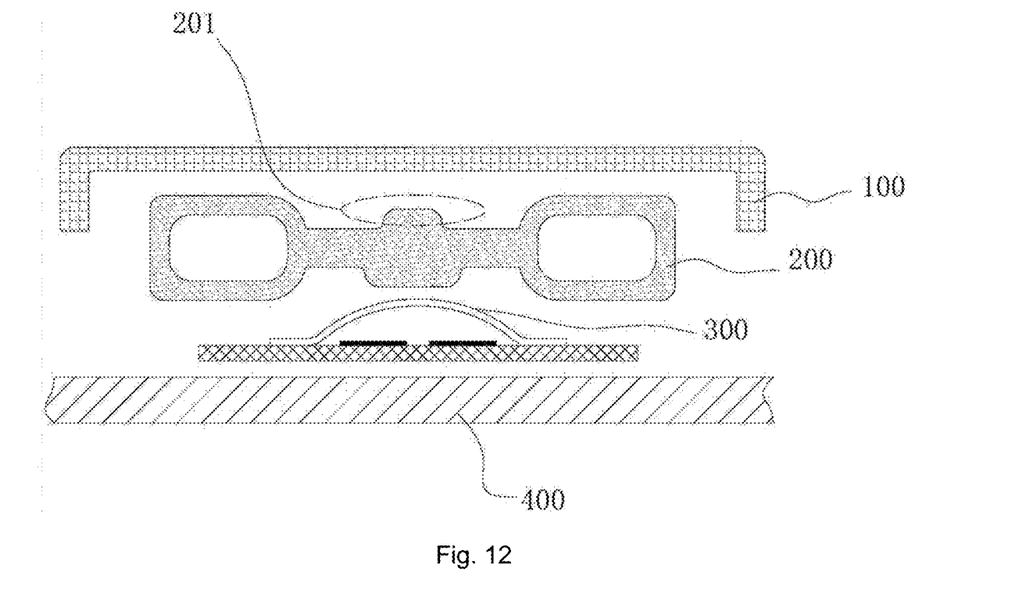
FIG. 12 is a schematic structural diagram of a human body pressure switch provided by a seventh embodiment of the present disclosure.

FIG. 12 is a schematic structural diagram of a human body pressure switch provided by a sixth embodiment of the present disclosure. The pressure switch element 300 may be arc-shaped, with its highest point corresponding to the protrusion on the elastic pressure-contact body 200 in position.

Figure 3:
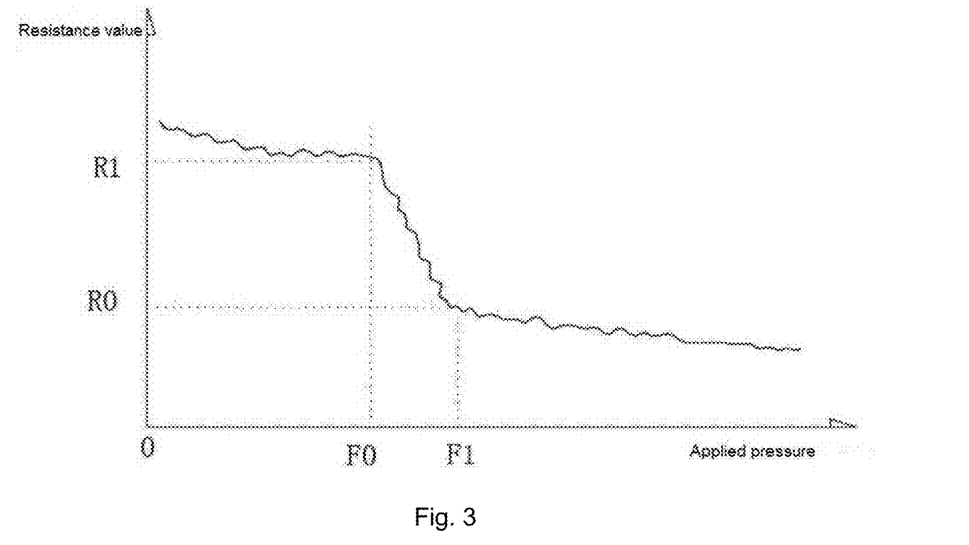
FIG. 3 is a curve showing the relationship between human body pressure and a resistance value provided by an embodiment of the present disclosure.

Referring to FIG. 3, FIG. 3 is a curve showing a relationship between a human body pressure and a resistance value provided by an embodiment of the present disclosure.

When the seat is not occupied by an occupant, the upper surface of the pressure bearing plate at the upper side of the pressure switch element 300 is only subjected to a relatively small pre-pressure F0. In this case, the spacing support structure 202 in a flexural waveform shape at the first stage of the elastic pressure-contact body 200 plays a first stage supporting role, such that the force support protrusion 201 of the elastic pressure-contact body 200 is not fully in contact with the sensing contact 307 of the pressure switch element 300. Since the sensing contact 307 of the pressure switch element 300 is not subjected to an extruding force of the force support protrusion 201, in this case, the contact point of the pressure switch element is not conducting, and the resistance property thereof is manifested in a relatively large resistance value R1.

When the seat is occupied by an occupant, the upper surface of the pressure bearing plate at the upper side of the pressure switch element 300 is only subjected to a relatively large pre-pressure F1. In this case, the first stage supporting role of the spacing support structure 202 with a flexural waveform shape at the first stage of the elastic pressure-contact body 200 is not able to support the impact applied by the huge body weight of a human body, such that the force support protrusion 201 of the elastic pressure-contact body 200 goes downward, rapidly and fully contacting the sensing contact 307 of the pressure switch element 300, and extruded by the solid force support protrusion 201 the sensing contact 307 conducts between two electrodes. Since the conduction of the sensing contact 307 of the pressure switch element 300 is enabled by extruding, in this case the resistance property at the contact point of the pressure switch element 300 is manifested in a relatively large resistance value R1 rapidly changed into a relatively small conductive resistance value R0.

This property of rapid conversion between impedances has changed from the relatively slowly changing resistance value in the past, and has a great positive effect on the occupant identification of such a vehicle seat. The window error that occurs when the electronic control unit (ECU) performs resistance determination may be reduced, implementing a digital determination of analog-to-digital conversion, and providing better performance improvement.

The present disclosure further discloses a vehicle seat including a human body pressure switch, where the human body pressure switch is the human body pressure switch disclosed in the above embodiments. A first pressure bearing plate 400 is carried above a cushion frame 600 of the seat; a pressure switch element 300 is located between the first pressure bearing plate 400 and an elastic pressure-contact body 200, and the elastic pressure-contact body 200 is located below a second pressure bearing plate 100, and the above structures are assembled together by an attachment pin 700. A sensing contact of the pressure switch element 300 is activated by being extruded, sensing the human body occupation pressure from the seat surface and generating an electrical conductor signal; and a wire joint 800 at one end of the elastic pressure-contact body 200 is connected with an external vehicle body circuit (not shown) via a connecting wire or/and a connector 900 (see FIG. 10).

The present disclosure further discloses a method for processing a human body pressure switch, and the method for processing a human body pressure switch includes steps as follows.

An elastic pressure-contact body 200 is provided at the upper side or the lower side of the pressure switch element 300, where the elastic pressure-contact body 200 includes a spacing support structure 202 and a force support protrusion 201.

The force support protrusion 201 is made to correspond to a sensing contact 307 of the pressure switch element 300.

Herein, the spacing support structure 202, in a state of an external force applied, is deformed by amount greater than the amount of deformation of the force support protrusion 201; and the spacing support structure 202, in a state of no external force applied, plays a supporting role.

The various embodiments in the description are described in a progressive manner, with each embodiment focused on differences from other embodiments, where the same similar parts between the various embodiments may be referred to each other.

The above description of the disclosed embodiments enables those skilled in the art to make or use the present disclosure. Various modifications to these embodiments are apparent to those skilled in the art, and the general principles defined herein may be implemented in other embodiments without departing from the spirit or scope of the present disclosure. Therefore, the present disclosure is not limited to the embodiments shown herein, but the broadest scope is consistent with the principles and novel features disclosed herein.

INDUSTRIAL APPLICABILITY

With the human body pressure switch provided by the present disclosure, in a state where no person is seated on the seat, by the supporting role of the spacing support structure, the sensing contact of the pressure switch element is prevented from being affected by a pre-pressing force such as the internal stress of the sponge structure of the seat and the weight of the sponge cushion.

The invention claimed is:

1. A human body pressure switch, comprising: a pressure switch element and an elastic pressure-contact body provided at an upper side or a lower side of the pressure switch element, wherein the elastic pressure-contact body comprises a spacing support structure and a force support protrusion; the force support protrusion corresponds to a sensing contact of the pressure switch element; the spacing support structure, in a state of an external force applied, is deformed by an amount greater than an amount of deformation of the force support protrusion; and the spacing support structure, in a state of no external force applied, plays a supporting role, wherein the spacing support structure is of a bending structure, a hollow structure or a spacing hollow structure, the elastic pressure-contact body comprises one receiving slot, the force support protrusion is provided at a bottom of the receiving slot, and the force support protrusion extends towards a slot opening of the receiving slot and protrudes beyond the slot opening of the receiving slot, two spacing support structures, located at a same side of the force support protrusion and adjacent to the force support protrusion, form one spacing support structure group, the two spacing support structures in the spacing support structure group protrude outward from opposite sides of the elastic pressure-contact body, respectively, one of the two spacing support structures in the spacing support structure group, which is closer to the force support protrusion, protrudes from the elastic pressure-contact body in a same direction as a direction in which the force support protrusion protrudes, and the other one of the two spacing support structures in the spacing support structure group protrudes from the elastic pressure-contact body in a direction opposite to the direction in which the force support protrusion protrudes.

2. The human body pressure switch according to claim 1, wherein the force support protrusion is of a solid structure and has a wall thickness greater than a wall thickness of the spacing support structure, and a material of the elastic pressure-contact body is an elastic rubber-plastic material.

3. The human body pressure switch according to claim 1, wherein the elastic pressure-contact body is located between the pressure switch element and a sponge cushion of a vehicle seat.

4. The human body pressure switch according to claim 1, wherein a material of the elastic pressure-contact body is selected from the group consisting of natural rubber, elastic silicone rubber, ethylene propylene diene monomer rubber, styrene-butadiene rubber, flexible polyurethane elastomer plastic and polyolefin thermoplastic elastomer plastic.

5. The human body pressure switch according to claim 1, wherein the elastic pressure-contact body comprises a plurality of spacing support structures, the plurality of spacing support structures are provided to be spaced apart from each other, and one force support protrusion is provided between every two adjacent spacing support structures.

6. The human body pressure switch according to claim 1, wherein one side of the elastic pressure-contact body facing away from the force support protrusion is a force support surface, and the force support surface is configured to provide a force for pressing down a top of the sensing contact of the pressure switch element, for being depressed.

7. The human body pressure switch according to claim 1, wherein the spacing support structure protrudes outward from one side of the elastic pressure-contact body and is provided with an inwardly recessed groove at the other side of the elastic pressure-contact body, with the spacing support structure being arch-shaped.

8. The human body pressure switch according to claim 1, wherein each of the two spacing support structures in the spacing support structure group is U-shaped or V-shaped, and is provided with an inwardly recessed groove at a side away from the spacing support structures, with the groove being U-shaped groove or a V-shaped groove.

9. The human body pressure switch according to claim 1, wherein the spacing support structure as a whole is of a hollow structure, both ends of the spacing support structure protrude outward from opposite sides of the elastic pressure-contact body, respectively, the force support protrusion protrudes outward from one side of the elastic pressure-contact body, and a protrusion is provided at the other side of the elastic pressure-contact body facing away from the force support protrusion, with one side surface of the protrusion away from the force support protrusion being a force support surface.

10. The human body pressure switch according to claim 9, wherein the pressure switch element is arc-shaped, with a highest point of the pressure switch element corresponding to the protrusion on the elastic pressure-contact body in position.

11. The human body pressure switch according to claim 1, wherein the force support protrusion is of a cylindrical shape, a mushroom shape or a wall shape.

12. The human body pressure switch according to claim 1, wherein the human body pressure switch further comprises:
a first pressure bearing plate provided at one side of the pressure switch element away from the elastic pressure-contact body; and
a second pressure bearing plate provided at one side of the elastic pressure-contact body away from the pressure switch element.

13. The human body pressure switch according to claim 12, wherein the elastic pressure-contact body is located between the pressure switch element and the second pressure bearing plate, the force support protrusion protrudes outward from one side of the elastic pressure-contact body away from the pressure switch element, and an opening is provided at one side of the force support protrusion away from the pressure switch element.

14. The human body pressure switch according to claim 12, wherein the pressure switch element and the elastic pressure-contact body each are provided therein with a fixing hole through which an attachment pin and/or a guide post can pass, and the pressure switch element and the elastic pressure-contact body are fixed by making the attachment pin and/or guide post pass through the first pressure bearing plate and the second pressure bearing plate.

15. The human body pressure switch according to claim 1, wherein the pressure switch element is a foil switch element or a microswitch, with the microswitch consisting of a metal dome and a printed circuit board.

16. A vehicle seat, comprising the human body pressure switch according to claim 1.

17. A method for processing the human body pressure switch according to claim 1, comprising:
- providing the elastic pressure-contact body at the upper side or the lower side of the pressure switch element, wherein the elastic pressure-contact body comprises the spacing support structure and the force support protrusion; and
- making the force support protrusion correspond to the sensing contact of the pressure switch element;
- wherein in the state of an external force applied, the spacing support structure is deformed by an amount greater than an amount of deformation of the force support protrusion, and the spacing support structure, in the state of no external force applied, plays the supporting role.

\* \* \* \* \*